June 8, 1937.　　　　P. H. CHASE　　　　2,082,789
SIGNAL
Filed Sept. 15, 1933　　　6 Sheets-Sheet 1

Philip H. Chase,
Inventor.
Delos G. Haynes,
Attorney.

June 8, 1937.  P. H. CHASE  2,082,789
SIGNAL
Filed Sept. 15, 1933   6 Sheets-Sheet 2

Philip H. Chase,
Inventor
Delos G. Haynes
Attorney.

June 8, 1937.                P. H. CHASE                2,082,789
SIGNAL
Filed Sept. 15, 1933                6 Sheets-Sheet 3
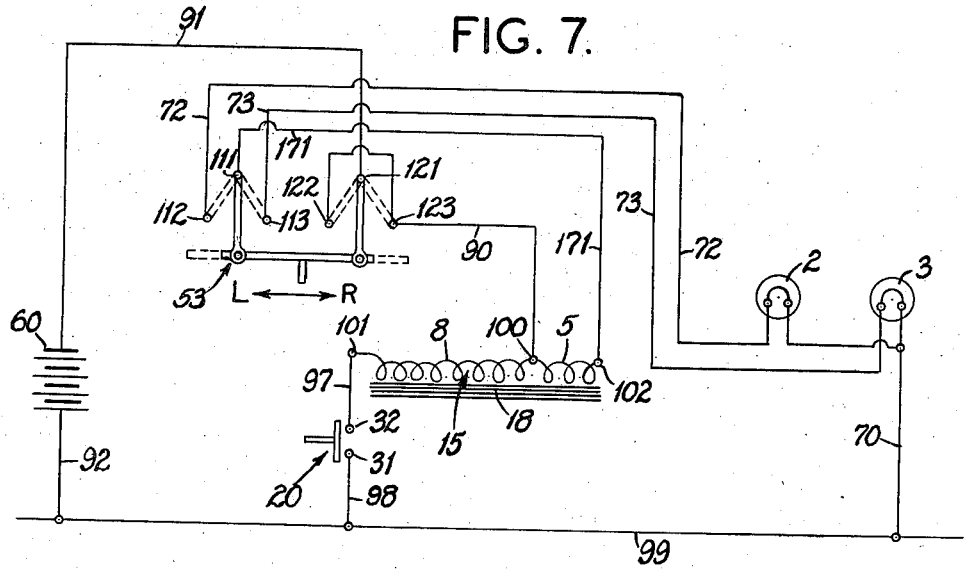
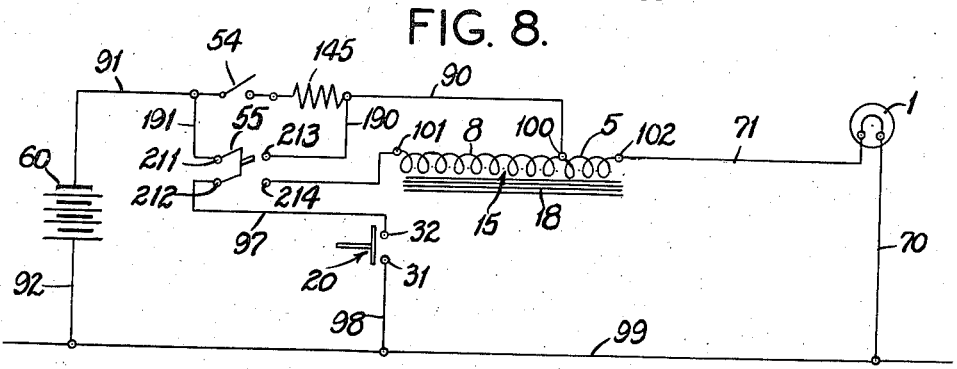
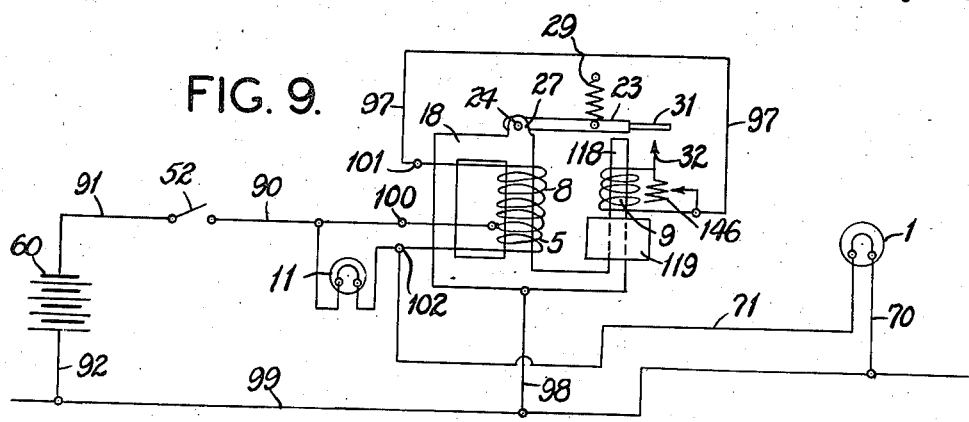

June 8, 1937.     P. H. CHASE     2,082,789
SIGNAL
Filed Sept. 15, 1933     6 Sheets-Sheet 4
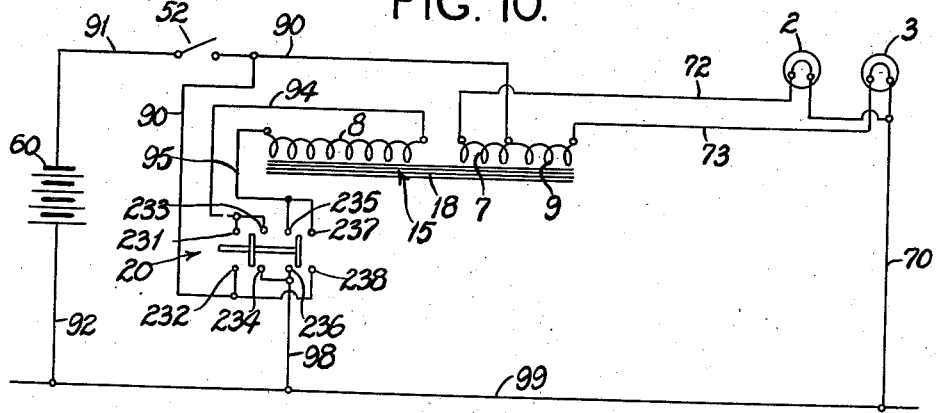
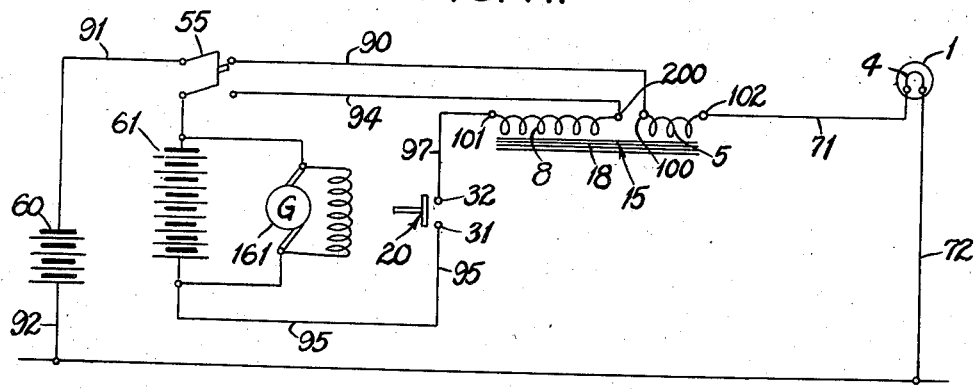
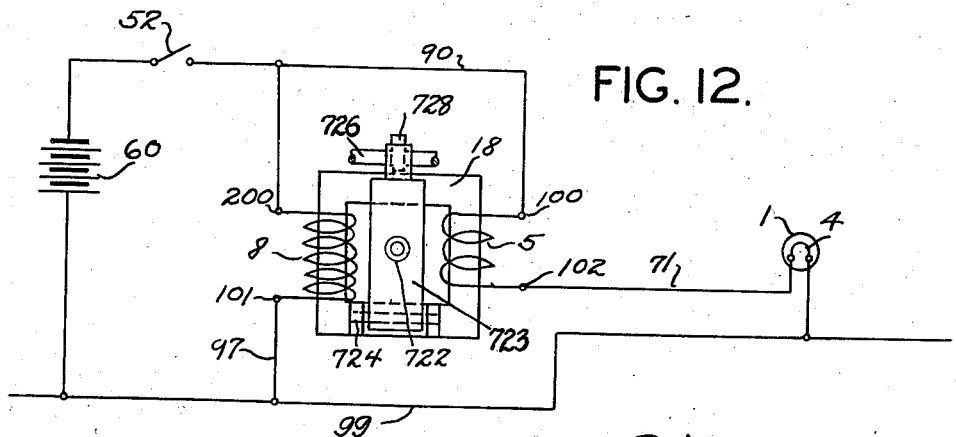

FIG. 13. FIG. 14. FIG. 15.
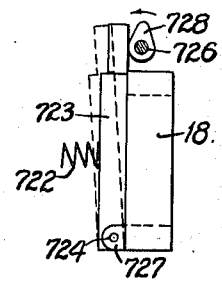
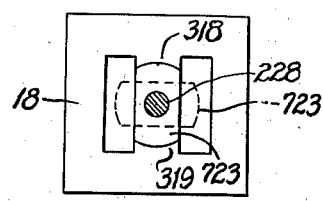
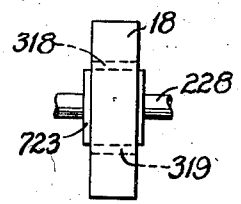
FIG. 16. FIG. 17.
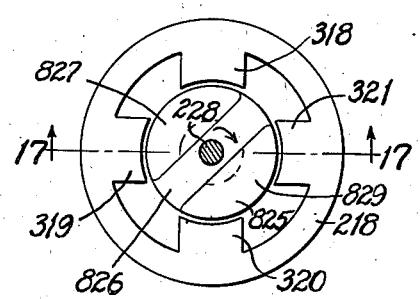
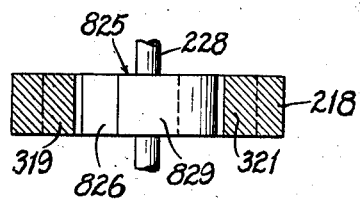
FIG. 18.
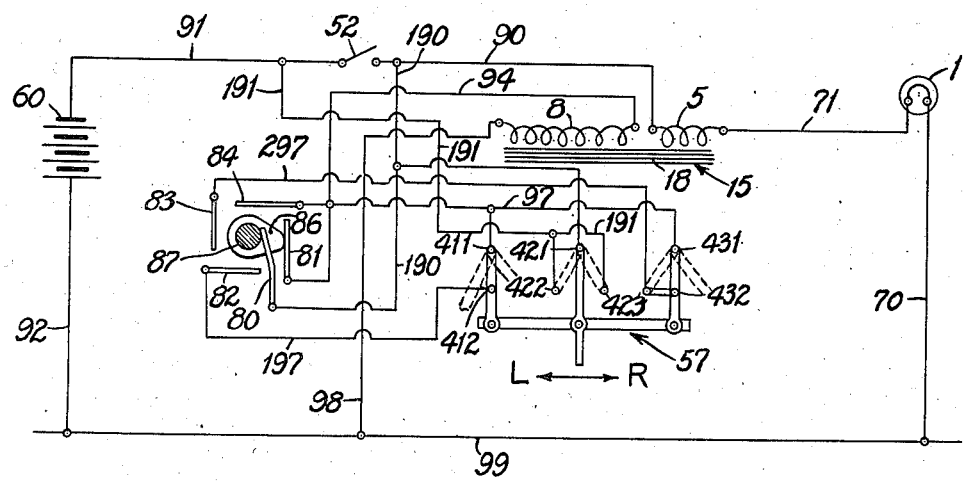

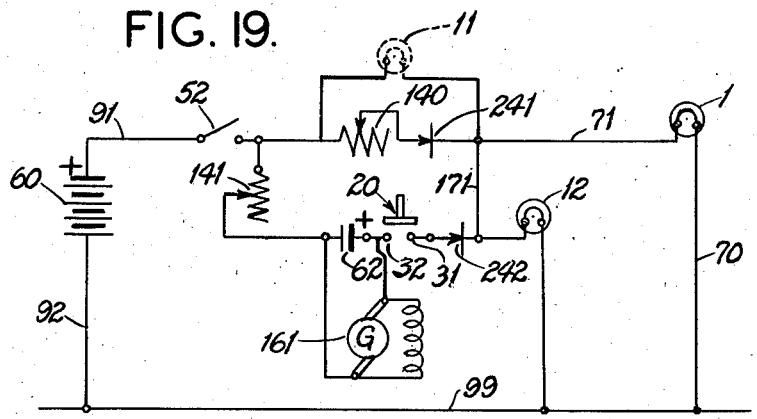
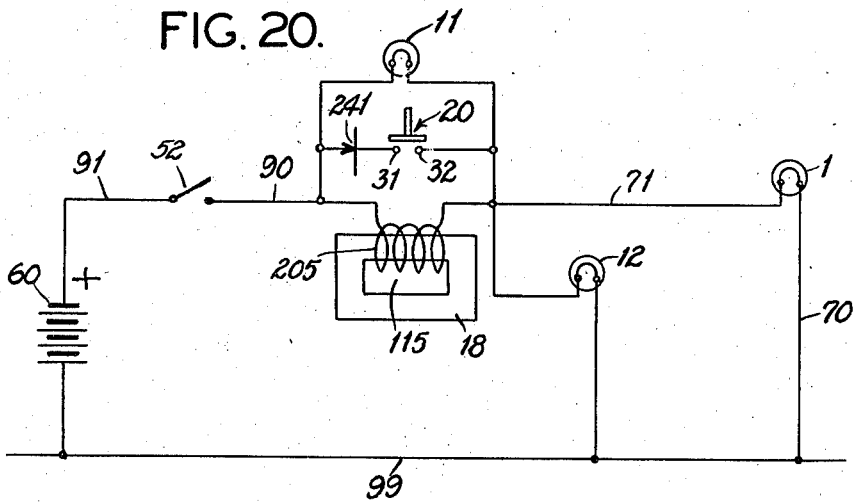

Patented June 8, 1937

2,082,789

UNITED STATES PATENT OFFICE 2,082,789

SIGNAL

Philip H. Chase, Bala-Cynwyd, Pa.

Application September 15, 1933, Serial No. 689,556

10 Claims. (Cl. 177—311)

This invention relates to a light signal system and with regard to certain more specific features to a direct-current signal system.

Among the several objects of the invention may be noted the provision of a signal light which by recurring variations in light intensity more quickly attracts the attention of the observer; the provision of a more effective "stop" and/or direction signal light; the provision of means for recurrently varying signal light brightness without opening the signal circuit; the provision of a pilot lamp which indicates the operation and condition of the system; the provision of a variably modulated light signal; the provision of effective signal lamp operation in the event of burn-out of the pilot lamp and/or the stoppage of certain of the apparatus; and the provision of a multiple-purpose system wherein a single lamp affords illumination and a signal. Other objects will be in part obvious and in part pointed out hereinafter.

The invention accordingly comprises the elements and combinations of elements, features of construction, and arrangements of parts which will be exemplified in the structure and circuits hereinafter described, and the scope of the application of which will be indicated in the following claims.

In the accompanying drawings, in which are illustrated several of various possible embodiments of the invention, Fig. 1 is a diagrammatic layout of one form of the invention;

Figs. 2 to 8 show modifications of the form of the invention shown in Fig. 1;

Fig. 9 shows a form of the invention in which an impulse transformer and a contactor are combined;

Fig. 10 shows a form of the invention similar to that shown in Fig. 6 but shows opposed action of certain secondary series coils;

Fig. 11 shows a modified energizing method;

Fig. 12 shows a modification in which mechanical means is used for short circuiting a magnetic circuit;

Fig. 13 is a diagrammatic side elevation of certain core parts of Fig. 12;

Fig. 14 is a detail of another form of core parts of Fig. 12;

Fig. 15 is a side elevation of Fig. 14;

Fig. 16 is a plan view of a modified form of armature and core parts;

Fig. 17 is a vertical section taken on line 17—17 of Fig. 16;

Fig. 18 illustrates another form of the invention, broadly considered;

Fig. 19 illustrates a modification in which energy transfer is effected by methods alternatively to those shown in Figs. 1 to 18; and, Fig. 20 illustrates a modification of the structure of Fig. 19 in which a modulation is effected by energy withdrawal instead of by energy addition as in said Fig. 19.

Similar reference characters indicate corresponding parts throughout the several views of the drawings.

It is known practice to mount on the rear of a motor vehicle an electric "stop" signal which is lighted upon the application of the brakes, by the closing of a switch actuated from the foot brake mechanism. It thus gives a signal often anticipatory of the slowing and complete stopping of the vehicle. Such a "stop" light signal is usually contained in or adjacent to the electric rear light housing, often is the same color as the tail light, and sometimes consists of one of the filaments in a two-filament lamp, the other filament being used for the tail light.

Consequently, the efficacy of the usual "stop" light signal is greatly reduced, particularly at night, because once it is lighted it is usually unchanging and may be similar in appearance to the tail light. It does not continue to give an unmistakably distinctive signal warning that a vehicle is slowing, stopping, or has stopped.

The practice of signalling "left" and "right" turns by hand is little observed and when done, often escapes notice, or is not understood. Such hand signals are usually inconvenient to the driver of a closed vehicle, particularly during inclement weather. Electric direction signals of the usual types are subject to similar difficulties as the "stop" light.

The provision of means for causing the flickering or blinking of "stop" and direction light signals may afford a warning signal different from the tail light, but these results have often been secured at the expense of added complications and liability of complete impairment of operation of the signal devices, and, among certain other disadvantages, omit means indicating to the vehicle driver the operation and condition of the signal system.

The present invention secures the advantages of a controlled modulated signal by relatively simple apparatus, and provides for the inclusion of a pilot lamp when desired, under the eyes of the driver, or of another occupant of the vehicle, which indicates the operation and condition of the signal system.

It is to be understood that the method and apparatus of the present invention is useful in other applications than to vehicles; for example, on crossing gates, traffic signals, switchboard signals and the like, wherein similar requirements may exist. The vehicle application is used merely by way of example.

Figure 1:
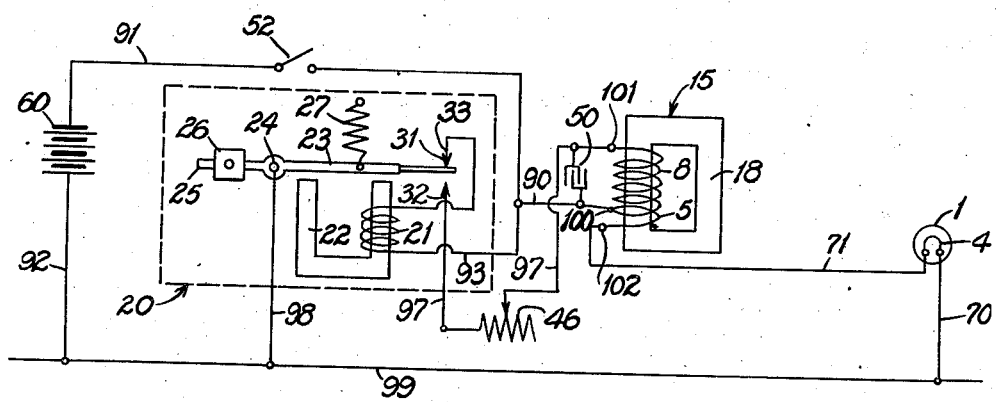

Referring now more particularly to Fig. 1, there is illustrated at numeral 1 an electric signal lamp with filament 4, connected by wire 71, in series with coil 5, wire 90, switch 52 and wire 91 to a battery 60. The signal lamp circuit is completed by wires 92, 99 and 70. For example, as applied to a motor vehicle, the signal lamp 1 may be a six to eight volt tungsten filament automobile type lamp of three to thirty-two rated candle power; the switch 52 may be actuated, for example, by the foot-brake mechanism to close the switch when the brake pedal is depressed in case the signal lamp is for a "stop" warning, or the switch may be actuated manually in case the signal lamp is for a direction signal; the battery may be the usual lead storage battery, and the wire 99 may be replaced by the metal frame of the vehicle.

The series coil 5 having terminals 100, 102 is the secondary winding or coil of an impulse transformer 15 wherein both the said secondary coil and a primary coil 8 having terminals 100, 101, are wound on a magnetic iron or steel core 18. The primary coil 8 is connected across the supply circuit, between wires 90 and 99, by the wires 97 and 98 in series with the contacts 31 and 32 of the contactor device 20.

The contactor device 20 recurrently closes and opens the contacts 31 and 32, at a frequency within a suitable range, so that as long as switch 52 remains closed, the primary coil 8 is successively energized and de-energized.

In the electromagnetic contactor device or vibrator 20 illustrated in Fig. 1, a coil 21 is wound about a magnetic core 22, which is associated with an armature 23 pivoted at 24, with an extension 25 on which is mounted a weight 26. The armature is normally retracted from the core 22 by a spring 27. A portion of or extension of the armature, 31 is adapted to make contact with contact 33 when the armature is retracted as shown and, when the armature moves toward the core 22, to break the contact with 33 and make contact with contact 31.

Upon closing of switch 52, in addition to the current passing through wire 90, series coil 5, and wire 71 to the signal lamp 1, the current for the shunt coil 21 passes through wire 93, coil 21, contact 33, armature extension 31, armature 23 and back to the battery through wires 98, 99 and 92, and the magnetic flux is produced through the core and armature.

By the attraction of the armature 23, the restraining force of spring 27 is overcome, the armature 23 moves downward, contact is broken between armature extension 31 and contact 33, and contact is made between armature extension 31 and contact 32. The contact between armature extension and contact 32 completes the circuit to the primary coil 8, through wire 97.

Immediately upon the opening of the circuit through coil 21 by the aforesaid breaking of contact between armature extension 31 and contact 33, the magnetic flux through the core 22 and armature 23 rapidly decreases, the spring 27 retracts the armature, contact is broken between armature extension 31 and contact 32 and the primary coil is de-energized, and then contact is re-established between armature extension 31 and contact 33. Thereupon the circuit connections become the same as at the instant switch 52 was closed, and as long as the switch remains closed this same cycle of operation will take place repeatedly.

The function of the contactor 20 also can be performed by other suitable means. As generally applied to the usual types and sizes of automobile electric lamps, the frequency of closing the contacts should preferably fall between two and ten per second, because of the relation of persistence of vision and lag in filament incandescence and cooling to desirable variability or modulation of light from the signal lamp, but the frequency for a given signal device need not remain constant and in some embodiments, it may be desirable for it to vary, for example, with the speed of the vehicle.

In the impulse transformer 15, the secondary coil 5 and the primary coil 8 are magnetically closely linked by being wound on the magnetic iron or steel core 18. In this embodiment these two coils preferably are connected with their magnetomotive forces opposing and the ampere-turns of the primary coil are at least twice those of the secondary coil, and may be considerably greater than twice. The resistance of the secondary coil is preferably low. It has been found that a secondary coil resistance drop from ten to twenty per cent of the signal circuit voltage is suitable, although considerable deviations from this range are permissible.

Upon the closing of the switch 52, current from the battery 60 passes through the series circuit 91, 90, 5, 71, the signal lamp 1, and wires 70, 99 and 92. If at that time the contacts 31, 32 are open, the signal lamp current passing through the series or secondary coil 5 causes magnetic flux to build up in the core 18 in a certain direction, hereinafter referred to as the secondary direction. In a small fraction of a second the contactor causes the contacts 31, 32 to close, current starts to flow through the primary coil 8 and increases at a rapid rate. Because the magneto-motive force of the primary coil is opposed to and greater than that of the secondary coil, the magnetic flux in the core 18 rapidly decreases, reverses its direction and increases in that opposite direction, hereinafter called the primary direction. When the contacts 31, 32 open a fraction of a second later and interrupt the primary coil current, the magnetomotive force of the primary coil disappears and the flux rapidly reverses to the secondary direction.

These changes of flux through the secondary coil induce voltages therein proportional to the rate of change of flux and in a direction opposing that change. Therefore, while the flux is changing from its secondary direction to its primary direction, there is induced in the secondary coil a voltage aiding the flow of the current through the secondary coil 5 and the signal lamp 1. Consequently, during this period of change the voltage impressed upon, and the light emanating from the signal lamp, are increased. Conversely, while the flux is changing from its primary direction to its secondary direction, there is induced in the secondary coil a voltage opposing the flow of current through the secondary coil 5 and the signal lamp 1, and during this latter period of change the voltage impressed upon, and the light emanating from, the signal lamp are decreased.

For convenience, hereinafter the magnetic flux change and induced secondary coil voltage existing during the change of flux from secondary direction to primary direction may be referred to respectively as the "secondary-primary flux change" and the "secondary-primary voltage"; similarly those existing during the change of flux from primary direction to secondary direction may be referred to respectively as the "primary-secondary flux change" and the "primary-secondary voltage".

It is therefore apparent that, for each cycle of opening and closing of the primary coil contacts 31, 32, there is impressed on the signal lamp circuit through the secondary coil successively an additive voltage impulse and a subtractive impulse which produce corresponding changes to modulate the light from the signal lamp. The order of magnitude of the modulation is indicated by the sum of the primary-secondary and secondary-primary voltage impulses, hereinafter referred to as the "swing voltage".

The design and construction of the impulse transformer, its component parts and associated apparatus can be varied considerably in order to conform to various signal lamp sizes and rated voltages and to provide the desired secondary swing voltage. However, for example, it has been found that an impulse transformer with a core of 1.6 square inch cross-section and 7.5 inches length magnetic path, a series coil of 90 turns No. 16 gauge wire and a primary coil of 250 turns No. 20 gauge wire, connected in a 6 volt vehicle signal circuit (illustrated in Fig. 1) will produce a swing voltage of approximately three volts on a signal lamp load of 25 watts, consisting of the usual motor vehicle type tungsten lamp or lamps. The resistance drop through the series coil is only about one volt and, if desired, can readily be decreased by the use of larger wire therein. This is advantageous in event of non-operation of the contactor.

For various signal lamp loads the desired swing voltage can be secured with an impulse transformer constructed with appropriate core dimensions, and coil wire sizes and turns. It is apparent that the brightness of the signal lamp is varied considerably both above and below normal brightness, that is, the brightness corresponding to the circuit voltage minus the resistance drop through the series coil. Because the light flux from a tungsten lamp is a function of the voltage to more than the third power, there can be secured a large percent variation of the total light flux from the signal lamp. This variation may be as great as, or greater than, the light flux at normal brightness, depending upon the design of the impulse transformer and its control as hereinafter described.

Thus, without recurrently interrupting the portion of the circuit supplying the signal lamp and without introducing therein a substantial resistance drop, a high degree of signal visibility is secured together with a normal brightness closely approaching the brightness at full signal circuit voltage. In many applications of the invention, these advantages are secured with a smaller signal lamp than is used with other types of signals.

The magnitude of signal light modulation is largely determined by the magnitude of the swing voltage, which is in turn a function of the rates of change of magnetic flux through the secondary coil 5. In some applications of the invention, it may be desired to adjust the signal lamp modulation or to vary it from time to time manually or automatically. Fig. 1 shows one means for such control comprising a resistor 46 connected in wire 97 of the primary coil circuit. Its resistance may be fixed or variable and adjusted by external means.

When the resistance of the resistor is controlled by external means, the control for example, may be convenient to the vehicle operator, or may be actuated by the brake pedal, or by the exterior lighting switch, or by the transmission. By such a resistor the swing voltage can be varied from its full value, for the particular impulse transformer and signal lamp load, to a very small percentage of the full value, without changing the normal brightness of the signal lamp or lamps. Consequently, with this primary resistor method of control, the signal may be made more or less compelling at will or under predetermined varying conditions, such, for example, as daylight and darkness, or easy or rapid braking. It is to be understood that the series resistor 46 in many embodiments can be omitted and the desired maximum primary coil current determined by the selection of the size of wire and number of turns in the primary coil alone.

Figure 2:
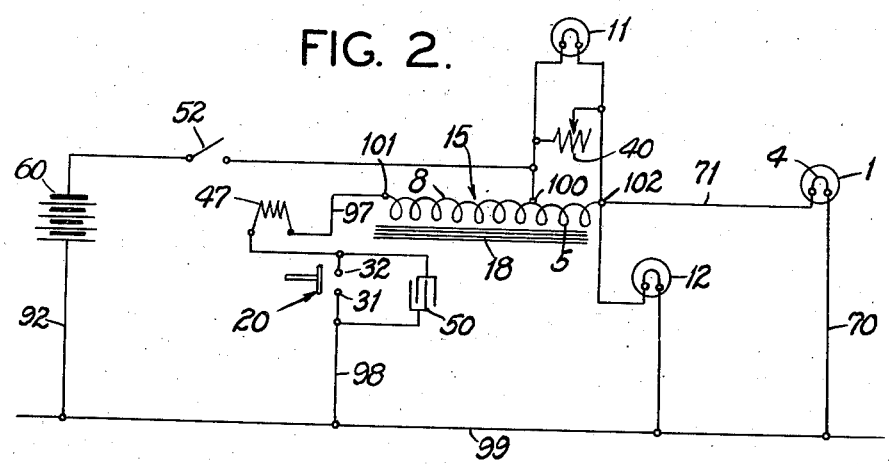

In Fig. 2 the contactor 20 or equivalent means, and the impulse transformer 15 of Fig. 1, are indicated symbolically. Fig. 2 illustrates at numeral 47 resistance increasing with increasing current therethrough known as the ballast type, as distinguished from a resistance which is substantially constant or fixed for all current values. This resistor is connected in the primary coil circuit, which permits the use of a primary coil of lower inductive (fewer turns) and/or lower resistance (for example, larger wire) and thus results in a materially higher swing voltage, but limits or decreases the maximum value of the current through the primary coil. The rate of increase of the primary coil current is initially greater because upon the closing of the contacts 31, 32, the ballast resistor is relatively cold, and therefore its resistance is low. As the primary coil current increases, the resistance of the ballast resistor rapidly increases materially above its initial value and thus, depending upon the relation between the circuit elements, may become the predominating element in limiting the primary coil current. It has been found that a motor vehicle type tungsten lamp rated 15 or 21 candle power at 6 volts provides a suitable ballast resistor 47 for the impulse transformer and signal lamp load described hereinabove.

Fig. 2 also shows a manual means of control of signal lamp modulation, a resistance 40 being connected in parallel with the series coil 5.

The ballast resistance 47 of Fig. 2 may be used for a pilot lamp, for example, located inside a vehicle, to indicate to the operator the operation and condition of the signal system, provided it has a filament or wire which heats during the operation cycle to emit sufficient light. Other lamps, which function primarily, or solely, as pilot lamps, are also illustrated in Fig. 2 at numerals 11 and 12. Numeral 11 indicates a pilot lamp, such, for example, as a rated 3 candle power motor vehicle tungsten lamp, connected in parallel with the series coil 5, and numeral 12 indicates a pilot lamp connected in parallel with the signal lamp.

As the contacts 31, 32 make and break the current through the relatively high inductance of the primary circuit, if these contacts are subject to rapid wear or burning under such duty, the connection of a condenser 50 across the terminals of the primary coil 8 (Fig. 1) or across the contacts 31, 32 (Fig. 2) is desirable. It has been found that a condenser of 0.5 to 1 micro-farad is suitable, for either Fig. 1 or Fig. 2. Contact operation may be further improved, under some conditions, by the inclusion of a few ohms resistance in the condenser connections.

Figure 3:
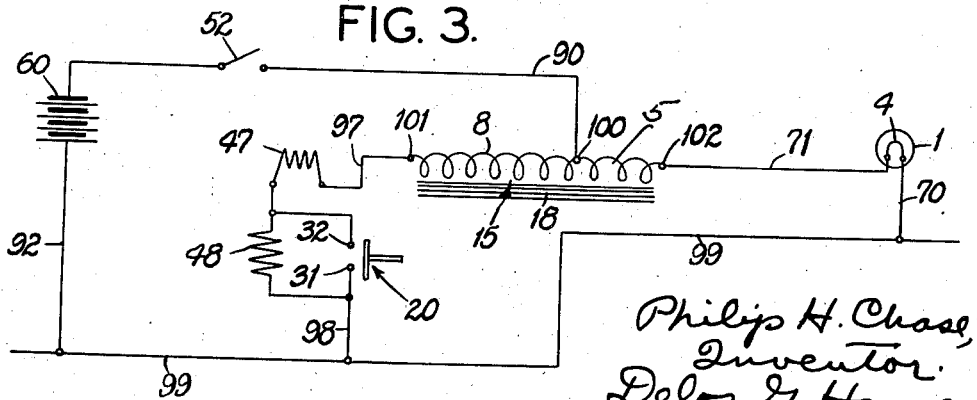

In Fig. 3 the series resistor 48 is short-circuited periodically by the contacts 31, 32 of the contactor 20. The resistor 48 preferably has several times the resistance of the primary coil so that when not short-circuited the current through the primary coil is a small fraction of the current when resistor 48 is short-circuited. There is preferably, though not necessarily, also included a ballast resistor 47 in series therewith.

Figure 4:
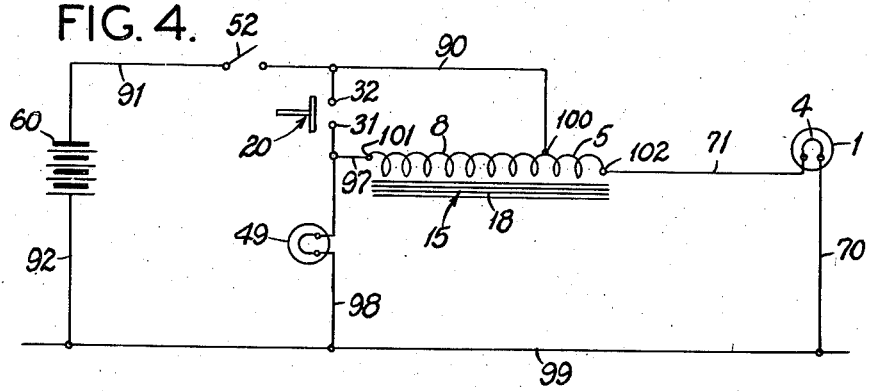

In Fig. 4 the primary coil 8 is connected across the circuit in series with a resistor 49, and the primary coil is periodically short-circuited by the contacts 31, 32 of the contactor device 20. In this embodiment, the resistor 49 preferably has a relatively low resistance compared with the resistor 48 of Fig. 3, and under some conditions it may be of the negative coefficient type such, for example, as is afforded by a carbon filament lamp, in which latter case it can also serve as a pilot lamp.

Figure 5:
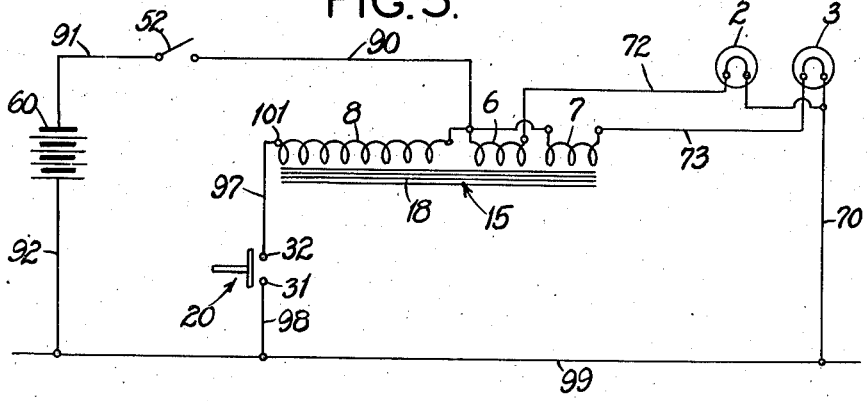

In Fig. 5 two signal lamps 2 and 3 are connected by wires 72 and 73 respectively to series coils 6 and 7 and these coils connected to coil 8 and wire 90, as illustrated, so that their magnetomotive forces are aiding each other, although they need not have the same number of turns nor be of the same size of wire. The series coils may alternatively be connected with their magnetomotive forces opposing as is illustrated in Fig. 10 and further described hereinafter. This embodiment is useful in many situations, for example, when it is desired to apply a different degree of modulation to the two signal lamps, or as illustrated in Fig. 6, to provide for the selection of one of two signal lamps with the minimum of switching changes in the signal lamp circuits.

Figure 6:
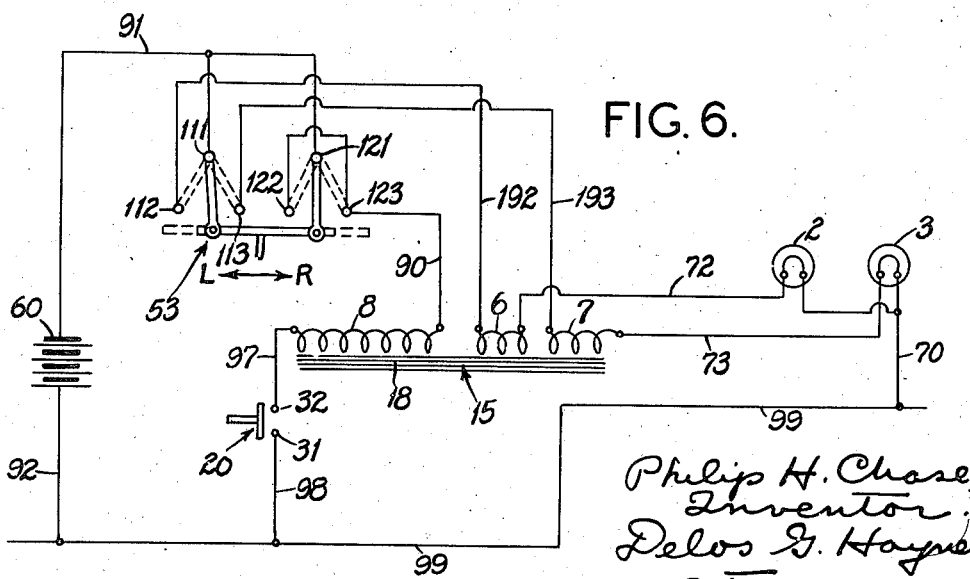

In Fig. 6 is illustrated control by a manually-operated switch 53 such as might, for example, be used in a motor vehicle to indicate left and right turns. The two signal lamps 2 and 3 are connected to separate coils as in Fig. 5, but the series coils are selectively energized, and the primary coil circuit simultaneously energized by means of the double-throw switch 53. In the left position L switch 53 energizes wire 192 through contacts 111, 112, and wire 90 through contacts 121, 122; and signal lamp 2 is modulated by primary coil 8 acting on series coil 6, the circuit through series coil 7 and lamp 3 being open. In the right position R switch 53 energizes wire 193 through contacts 111, 113 and wire 90 through contacts 121, 123; and signal lamp 3 is modulated by primary coil 8 acting on series coil 7, the circuit through series coil 6 and lamp 2 being open.

It is apparent that more than two signal lamps can be operated with the Fig. 5 and Fig. 6 methods, by utilizing an impulse transformer with the appropriate number of series coils and, in the case of the selective signal operation of Fig. 6, a selector switch similar to switch 53 but having an appropriate number of contacts. It is also apparent that two or more signal lamps in parallel may be operated from each series coil 6 and 7, instead of the single lamp illustrated. Such lamps in parallel and therefore controlled and modulated simultaneously may, for example, be mounted on both the front and rear of a vehicle to indicate left and right turns to traffic both in front and in the rear.

The selective signal lamp operation may also be afforded with one series coil as illustrated in Fig. 7, instead of the two series coils shown in Fig. 6. In Fig. 7 the wire 171 from the series coil 5 is connected to wire 72 through switch contacts 111, 112 and thus energizes and modulates signal lamp 2 when switch 53 is in the left position L, and when switch 53 is in the right position R, wire 171 is connected through switch contacts 111, 113 to wire 73 and thus energizes and modulates signal lamp 3.

Fig. 8 illustrates a signal system which utilizes only one lamp for two purposes, such for example, as a combination tail lamp and "stop" signal. This embodiment also has the advantage of utilizing only one wire to the dual-purpose lamp. When switch 54 is closed the signal light current passes through resistor 145, wire 90, series coil 5 and wire 71, but no current passes through the primary coil 8 because switch 55 is open. The resistance of resistor 145 is selected so that the signal lamp 1 burns steadily at reduced voltage, and therefore reduced brightness, but affords as much light as the usual tail light. When switch 55 is closed, switch 54 and resistor 145 are by-passed through wires 190, 191 and switch contacts 211, 213 and the primary coil is completed through switch contacts 212, 214. The signal lamp 1 therefore burns at full brightness and provides the modulated signal as hereinabove described as long as switch 55 remains closed.

If it is desired to have the lamp burn steadily at full brilliancy and also serve for signalling purposes, for example, as a combination cowl lamp, headlight, or mudguard lamp and a direction signal, the resistor 145 of Fig. 8 is omitted.

In Fig. 9 is illustrated an embodiment in which the impulse transformer and a contactor similar to that of Fig. 1 are combined. On an extension 27 of the magnetic core adjacent one end of the windings (coils 8 and 5) armature 23 is pivoted at 24. A branch magnetic core 118 is brought from the side of the main magnetic core 18, preferably adjacent the other end of the windings (coils 8 and 5), close to the free end of the armature 23. A portion of or extension of the armature 31 is adapted to make contact with contact 32 when the armature moves toward the branch core. On the branch core are a retardation collar or sleeve 119 of copper and a holding coil 9 connected in series with the primary coil 8 and contact 32. Holding coil 9 is connected so that its magnetomotive force acting around the branch core-armature path is in the same direction as that of secondary coil 5.

When switch 52 is closed current passes through the signal lamp circuit including wires 91, 90, series coil 5, wire 71 and signal lamp 1. Some of the magnetic flux set up by series coil 5 passes through the armature 23 and the branch magnetic path 118, and movement of the armature causes contacts 31, 32 to close and complete the primary coil circuit through wires 90, 97, holding coil 9, armature 23, core 18 and wire 98. Although the magnetomotive force of the primary coil 8 rapidly changes the direction of the magnetic flux in the main core, the magnetomotive force of the holding coil 9 also increases and acts to continue to maintain the flux through the branch core and thus hold the contacts 31, 32 together for a longer interval. When the magnetomotive force set up by the primary coil sufficiently decreases the flux through the branch core and armature, the armature is retracted by the spring 29, the contacts 31, 32 separate, the primary coil current is interrupted, the flux in the main core and branch core rapidly reverse to the secondary direction and another cycle of operation starts. The retardation collar or sleeve operates to lengthen the cycle of operation but under some conditions may be omitted. The periodicity of operation can be varied over wide limits by the selection of the number of turns of the holding coil 9 or a shunting resistor 146 can be included to secure the same result more readily, for example, when manual adjustment of modulation frequency is desired.

In case the signal lamp burns out or the signal lamp circuit otherwise opens, the contactor will not operate, as under that condition there is no current passing through the series coil. This feature is of advantage in indicating the operativeness of the signal system, with a pilot lamp 11 connected, for example, across the terminals 100, 102 of the series coil.

The signal system illustrated in Fig. 10 includes two signal lamps 2 and 3, which may be the same or of different sizes, connected by wires 72 and 73 respectively to series coils 7 and 8, which preferably are wound to give substantially equal and opposing magnetomotive forces. The primary coil 8 is energized through the contacts of the contactor 20 so that the primary coil current is periodically reversed as the contactor moves from its left position in which contacts 231, 232 and 235, 236 are closed to its right position in which contacts 233, 234 and 237, 238 are closed, and vice versa. As there is substantially no resultant flux set up by the two series coils the induced voltage therein is equal and opposite, that is, the induced voltage at any instant acts to aid the current flow in one secondary coil and to oppose the current flow in the other secondary coil. Therefore, when the impulse voltage on one of the signal lamps is above normal, the impulse voltage on the other is the same amount below normal, and vice versa, if the signal lamps are the same size. This embodiment is useful under many conditions, such for example, as in a vehicle "stop" signal, or, as a direction signal.

In Fig. 11 is illustrated a signal system with the primary coil 8 of the impulse transformer separately excited by means of a battery 61 through the wires 94, 95, 97, contact 200 and the contacts 31, 32 of contactor 20. A direct-current generator 161 is illustrated in parallel with the battery. Separate excitation of the primary coil is advantageous under some conditions, such for example, as when a higher voltage direct-current source than the battery is available, or when it is desired to eliminate the fluctuating primary coil current from the signal lamp supply circuit.

The generator may be replaced by any other suitable means for charging the battery 161, if it is a storage battery, or the generator may be omitted entirely if the battery is a primary battery. On the other hand, if it is desired to modulate the signal lamp voltage only when the generator is rotating, for example, with the generator on a motor vehicle and driven from the transmission or from the engine, the storage battery 161 may be omitted, and depending upon the voltage regulation characteristics of the generator, the modulation of the signal lamp may be kept substantially constant over a wide range of generator speed, or may vary with the generator speed.

Fig. 12 illustrates an embodiment in which the primary coil 8 and the series or secondary coil 5 are placed on separate legs of the magnetic circuit, with their magneto-motive forces opposing. A magnetic armature 723 periodically short-circuits the magnetic circuit 18. The primary coil ampere-turns are preferably at least twice those of the series coil. The short-circuiting armature is actuated by a cam, for example, on a motor vehicle, connected to the engine or transmission, or may be actuated by an electric motor or solenoid.

Fig. 13 shows (windings omitted) the right side elevation of the magnetic core 18, the short-circuiting armature 723, cam 728 and cam shaft 726 of Fig. 12. The armature 723 is pivoted at its lower end on the shaft 724 which is supported by the two bearings 727, 727. In the position shown, the two ends of the armature 723 are in contact with the cross members of the magnetic core and the magnetic flux set up by each coil 5 and 8 is short-circuited. While the shaft 726 and attached cam rotate 90° in the direction of the arrow, the lobe of the cam engages the armature extension and moves the upper end of the armature out of contact with the magnetic core, as indicated by the dotted lines, thus removing the magnetic short-circuit. The flux set up by the series coil 5 is rapidly overcome by the greater magnetomotive force of the primary coil 8 and voltage is induced in the "secondary-primary" direction in the series coil. As the cam rotates further, the cam surface permits the armature, under the pressure of the compression spring 722 and/or the magnetic attraction from the core, to resume its original position in contact with the core. As this takes place, the series coil flux rapidly re-establishes itself and there is induced therein a voltage in the primary-secondary direction. The modulation frequency is equal to the speed of the cam shaft. Other magnetic short-circuiters will suggest themselves.

In the modification of Figs. 14 and 15 the cylindrical magnetic armature 723 rotates, with a small air gap or no air gap (if the surfaces are lubricated) between the circular faced poles 318, 319, and the armature end faces formed to conform thereto. In the position illustrated the magnetic circuit between the core legs is short-circuited, while in the position 90° therefrom (shown dotted) the short circuit has been removed.

Figs. 16 and 17 illustrate another embodiment in which there are two primary core legs and two secondary core legs and a cylindrical rotor disposed therebetween. The two primary core legs 318 and 320 are diametrically located and on a diameter 90° therefrom are located the two series core legs 319 and 321. The core 218 magnetically connects and mechanically supports all four core legs. The inner face of each core leg preferably occupies one-eighth the circumference or 45°. The cylindrical rotor 825, mounted on shaft 228, rotates between the four circularly-faced pole faces, with a small air gap, or no air gap if the surfaces in contact are lubricated. There are two segment armatures 827 and 829, each of which spans an arc of 135°, with a non-magnetic gap between adjacent edges of 45°. Numerals 826 indicate non-magnetic material and/or air space.

As the rotor turns in the direction of the arrow, it passes the position 45° clockwise from the position illustrated, and the trailing edge of armature 827 breaks the magnetic path between primary core leg 318 and series coil leg 319 and the leading edge establishes a magnetic path between primary core leg 318 and series core leg 321. Simultaneously, the trailing edge of armature 329 breaks the magnetic path between primary core legs 320 and series core leg 321 and the leading edge establishes a magnetic path between primary core leg 320 and series core leg 319.

The primary coils on core legs 318 and 320 are preferably wound of opposite polarity, that is, so that the flux through core leg 318 passes into the rotor and the flux through core leg 320 passes out of the rotor or vice versa. Then the flux through each series core leg 319 and 321 reverses at the above 45° position of the rotor and at every quarter-revolution position therefrom. Preferably, each series core leg is wound with two coils of equal and opposing magnetomotive force and the coils on cores 319 and 321 which have the same instantaneous polarity may be connected in series or in parallel. Thus, depending upon the number, size and other characteristics, there may be two or four signal lamps modulated thereby similarly to the results secured by the embodiment of Fig. 10, for example, and the modulation frequency is twice the shaft speed.

Fig. 18 illustrates an embodiment with impulse transformer in which the signal lamp 1 serves as a "stop" signal, and as a "left" and "right" direction signal. The primary coil current is supplied through four spring distributor contacts 81, 82, 83, and 84 set at 90° intervals about a one-lobed cam 86 mounted on a shaft 87 rotated, for example, by the engine or the transmission, and at constant speed or variable speed. When switch 52, actuated by the foot brake mechanism, is closed, the signal lamp 1 is energized through wire 90, series coil 5 and wire 71. Simultaneously the shaft 87 and cam 86, both relatively insulated from the frame of the vehicle, are energized from wire 90 through wire 190 and brush 80. During every 90° of each revolution of the cam it makes contact and breaks contact successively with spring contacts 81, 82, 83 and 84. As long as switch 57 is in its middle position (as illustrated) all these four contact springs are connected to wire 97 so that, during each contact of the cam with each of the four springs, the primary coil circuit is completed through wire 97, primary coil 6 and wire 98, and then is broken a short time thereafter. Consequently the signal lamp is modulated, as hereinabove explained in detail, above and then below normal brightness for each such primary coil circuit make and break, and these modulations recur at uniform time intervals, thus:—

HL—HL—HL—HL—HL—HL—, etc.

where (—) indicates a period of normal brightness, (H) indicates a period of brightness above normal and (L) indicates a period of brightness below normal.

When switch 57, manually controlled by the operator, is thrown to the left (for example, to signal a left turn), brush 80 is energized through wire 191, switch contacts 421, 422 and wire 190, the connection from the spring 82 to wire 97 is broken by the opening of contacts 411, 412 (switch contacts 431, 432 remain closed) and consequently in each revolution of the cam 86, one of the four possible signal lamp modulations is eliminated and the following signal lamp modulation program takes place:—

HL—HL—HL————HL—HL—HL————
                    HL—HL—HL————, etc.

When switch 57 is thrown to the right (for example, to signal a right turn), brush 80 is energized through wire 191, switch contacts 421, 423 and wire 190, the connection from both springs 82 and 83 to wire 97 are broken by the opening of contacts 411, 412 and 431, 432 and consequently in each revolution of the cam 86, two of the four possible signal lamp modulations are eliminated and the following signal lamp modulation program takes place:—

HL—HL————HL—HL————
                    HL—HL————, etc.

It is apparent that by this apparatus there are produced at will, three distinct signal lamp indications, and that by appropriate additional spring contacts acted upon by cam 86 and by appropriate changes to the switch 57, other signals may be produced in different combinations and the desired results secured.

In Fig. 19 is illustrated a signal system in which there is modulating energy transfer between the signal lamp current and the source of electrical energy without the energy transfer therebetween being through a series coil in the signal lamp circuit. Under some circumstances, this alternative method has advantages, as will be apparent hereinafter. In series with the signal lamp 1 is a one-way electric valve 241, such for example, as a copper oxide-copper rectifier, and a resistor 140 in series. This valve is connected so that the signal lamp current from the battery 60 will pass through it but substantially no current can pass in the opposite direction. The resistor 140 may be omitted in case the resistance of the valve alone is sufficient and in case no variable modulation effect afforded by the resistor is desired. Alternatively, under some conditions the valve 241 may be omitted. An auxiliary battery 62 is in series with the contacts 31, 32 of the contactor 20 and in parallel with (shunting) valve 241 and resistor 140, and is connected so that its voltage aids or adds to that of the main battery 60. The contactor 20 may be the type illustrated in Fig. 1 or other suitable means which closes the contacts 31, 32 at a suitable modulation frequency, as hereinabove described.

When switch 52 is closed, and contacts 31, 32 are open, the signal lamp current passes through valve 241 and resistor 140, and the voltage on the signal lamp is the voltage of battery 60 less the drop therethrough. The total resistance of the valve and/or resistor may be of such value that signal lamp brightness is only little or substantially less (but still distinctly visible) than if the valve and resistor were omitted. After a fraction of a second, contacts 31, 32 close and connect battery 62 in series with and aiding the main battery 60, thus increasing the voltage on the signal lamp to the sum of the two battery voltages and increasing its brightness above that corresponding to the full main battery voltage. If the valve is omitted, the current through battery 62 is the algebraic sum of the signal lamp current and of the current through the resistor, but if, as is preferable, the valve is included, the current therethrough is only that of the signal lamp under the total voltage.

For example, it has been found on a signal lamp circuit, such as is usually employed on an automobile, that with a 6 volt battery 60, a 21 candle power 6–8 volt tungsten lamp, an auxiliary battery voltage of 2 volts and a valve and resistor of 1.2 ohms total resistance or less, there is a modulation which affords a distinctive signal. In the shunting or parallel circuit is also included resistor 141 and valve 242, although these may be omitted. Under some conditions a resistor such as 141 may be useful in regulating the modulation produced by the auxiliary battery or generator. The valve 242 may be useful under some conditions; for example, to prevent current reversal through the auxiliary battery source, or to provide modulation only in a direction aiding the main battery in case the auxiliary source is alternating current.

A direct-current generator 161 is illustrated in parallel with the auxiliary battery, but may be replaced by any other suitable means for charging the battery 62, if it is a storage battery. On the other hand, if, for example, it is desired fully to modulate the signal lamp voltage only when the generator is rotating (for example, with the generator on a motor vehicle and driven from the transmission or from the engine), the storage battery 62 may be omitted and a generator used alone. Depending upon the voltage regulation characteristics of the generator, the degree of modulation of the signal lamp may be kept substantially constant over a wide range of generator speed, or may vary with the generator speed. If the generator is of the alternating current type, the frequency of modulation may be determined by the change in speed thereof, or the frequency of modulation may be controlled independently of the generator speed, or of the frequency of an alternating current source which may take the place of the generator.

A pilot lamp 11 is included in the embodiment of Fig. 19, for example, in parallel with resistor 140 and valve 241, and numeral 12 indicates a pilot lamp connected in parallel with the signal lamp.

In Fig. 20 is illustrated a signal system in which the signal lamp is modulated by an inductance. By this apparatus there is secured modulation additional to that afforded solely by the ohmic resistance of coil of the inductance, because of a substantial withdrawal of energy from the signal lamp circuit into the magnetic core thereof, followed by the return of a substantial portion of such withdrawn energy to the signal lamp circuit and more or less energy dissipation in a short-circuit path or paths comprising the coil thereof. In the signal system illustrated by Fig. 20, the inductance 115 comprises a magnetic core 18 on which is wound coil 205, preferably of a large number of turns and low resistance; for example, in the "stop" signal circuit for a vehicle the resistance drop should preferably not exceed one-third of the signal circuit voltage. Coil 205 is connected in series with the signal lamp 1 and is periodically shunted or short-circuited by the closing of contacts 31, 32 of the contactor 20. The contactor 20 may be of the type illustrated in Fig. 1 or other suitable means which closes the contacts 31, 32 at a suitable modulation frequency, as herein described. Also, there is included in the shunting path an electric valve 241, preferably of considerably lower resistance than the resistance of coil 205, and connected so that the signal lamp current from the battery 60 will pass through it but substantially no current can pass in the opposite direction. This valve 241 is not, however, absolutely necessary. When switch 52 is closed and contacts 31, 32 are open, the increase of the signal lamp current to its full value determined by the total resistance in the circuit is delayed for a short interval by the counter-electromotive force induced from the building up of the flux in the magnetic core 18 of the inductance 115. Therefore, the voltage drop across inductance coil 205 for that short interval is greater than the resistance drop thereacross and the signal lamp is modulated below the amount corresponding to the resistance drop only therethrough.

After a fraction of a second, contacts 31, 32 close and shunt or short-circuit the inductance coil and substantially the greater portion of the signal lamp current passes direct from wire 90 to wire 71 through the shunting path comprising contacts 31, 32 instead of through the inductance coil 205. The energy of the magnetic field tends to oppose this decrease in current through the inductance coil, and for a short interval a voltage is induced therein in the direction aiding the flow of the signal lamp current. When the valve 241 is included in the shunting path, it prevents this induced voltage from dissipating itself by setting up a short-circuit current through contacts 31, 32, and causes the induced voltage to act on the signal lamp circuit to increase the voltage impressed on the signal lamp.

If the valve 241 is omitted, this induced voltage substantially vanishes from the signal lamp circuit as it sets up a short-circuit current, through the shunting path comprising contacts 31, 32, in a direction opposite to the flow therethrough of the signal lamp current. Thus the positive modulation of the signal lamp is suppressed because the energy of the magnetic field is dissipated in the short-circuit path instead of being substantially returned to the signal circuit when the valve is included.

Pilot lamps are included in the embodiment of Fig. 20, across the terminals of the inductance coil 205, and in parallel with the signal lamp. These are illustrated by numeral 11 indicating the former and numeral 12, the latter. Either or both may be eliminated.

It is apparent that the embodiments of Figs. 19 and 20 may be used in many of the signal lamp circuits herein described in place of the impulse transformer hereinabove described, such, for example with the dual-purpose signal lamps of Fig. 8, or with the coded modulation lamp of Fig. 18.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawings shall be interpreted as illustrative and not in a limiting sense.

I claim:

1. A signalling system comprising an electric signal circuit, a source of current therein, an electric signal therein, a secondary coil in series with said signal, said source of current energizing the signal to a predetermined signal strength by means of a predetermined voltage, and a magnetic circuit with which said coil is linked, means for periodically changing the flux through said magnetic circuit to cause an effect inclusive of a counter-electromotive force in the circuit, said last-named means comprising a primary coil linked with said magnetic circuit and current-varying means in circuit with said primary coil, said predetermined voltage of the source being sufficient to restore the signal to original strength upon the disappearance of said counter-electromotive force.

2. A signal circuit comprising signal means, a transformer, a secondary winding on said transformer and in series with said signal means, energizing means comprising a source of current at predetermined voltage, an electric circuit connecting said secondary winding with the energizing means and signal means, said signal means being energized by the voltage of said source, a primary winding on said transformer electromagnetically cooperating with said secondary winding to effect an aiding electromotive and a counter-electromotive force in the signal circuit to respectively increase and reduce the strength of the signal, said primary coil being connected across said electric circuit, a make-and-break contact in series with said primary winding, and electromagnetic means adapted to automatically operate said make-and-break contact and energized from said source of energy, said predetermined voltage of the source being sufficient to restore the signal to predetermined strength upon the disappearance of said counter-electromotive force and upon the consequent re-establishment of the source voltage in the signal circuit.

3. A signal circuit comprising signal means, an impulse transformer, a secondary winding on said transformer and in series with said signal means, energizing means of predetermined voltage, an electric circuit connecting said secondary winding to the energizing and signal means, said energizing means being adapted to initiate signal operation at said voltage, a primary winding on said impulse transformer electromagnetically cooperating with said secondary winding and energized from said energizing means to set up an opposite transformer flux, and means periodically to vary said energization to effect both aiding- and counter-electromotive forces in the circuit.

4. A signal circuit comprising signal means operating normally at a predetermined voltage, an impulse transformer, a secondary winding on said transformer and in series with said signal means, electric energizing means of predetermined voltage, means for connecting said electric energizing means with said secondary winding to operate the signal means normally at said predetermined voltage, a primary winding on said impulse transformer electromagnetically cooperating with said secondary winding to apply a counter-electromotive force to the signal circuit, and means adapted to periodically vary the flow of current through said primary winding, said predetermined voltage of the source being sufficient to restore the signal to original strength upon the disappearance of said counter-electromotive force and upon the consequent re-establishment of the source voltage in the signal circuit.

5. A direct current signalling system comprising a signal circuit, an electric signal therein comprising an incandescent-filament lamp, energizing means in the circuit for initiating energization of the lamp, a coil in series with said lamp, a transformer having a magnetic circuit with which said coil is linked, and means for periodically changing the flux through said magnetic circuit to apply at least a counter-electromotive force to the circuit, said last-named means comprising a primary coil linked with said flux path and means for variably energizing said primary coil.

6. In a signal system, a signal means, a secondary coil and an energy source of predetermined voltage both in series therewith, said source normally energizing said signal means at said voltage, a flux path linked with said coil, a primary coil also linked with said flux path and adapted to effect a counter-electromotive force to the signal means, and means adapted periodically to open and close a circuit to said primary coil, said voltage of the source being sufficient to return the signal means to normal energization upon disappearance of said counter-electromotive force.

7. In a signaling system, an electric signal, a coil connected in series with said signal, a transformer having a magnetic circuit linked with said series coil, a source of energy having a voltage adapted to normally initiate the signal, a signal circuit connecting the signal with the series coil and source of energy, a primary coil linked with said magnetic circuit and connected across the electric circuit, means for periodically changing the primary coil connection and thus the flux characteristics of the magnetic circuit, whereby modulation is effected of energy transferred between the source of energy and said signal means, the primary coil applying a repeated counter-electromotive force to the signal circuit, the voltage of the source being adapted to energize the signal normally when the counter-electromotive force is at a minimum.

8. In a signal system, a signal, a secondary winding and a source of energy having a voltage adapted to normally initiate the signal serially connected in a main signal circuit, a primary winding, a flux path interlinking said secondary and primary windings, said primary winding being connected to be variably energized from said source of energy, said primary winding periodically applying a counter-electromotive force to said main circuit whereby the signal voltage is modulated with respect to the voltage of the energy source.

9. In a signal system, a signal, a secondary winding and a source of energy operating at predetermined voltage serially connected in a main circuit, a primary winding, a flux path interlinking said secondary and primary windings, and means for periodically transferring energy between said primary and secondary windings whereby the signal voltage is modulated above and below the voltage of the energy source, the voltage of the energy source being adapted to energize the signal at source voltage after modulation of voltage below that of the source and before modulation above that of the source.

10. In a signal system, a signal, a secondary winding and a source of energy operating at predetermined voltage serially connected in a main circuit, a primary winding connected across said main circuit, a transformer forming a flux path interlinking said secondary and primary windings, and means for periodically transferring energy between said primary and secondary windings whereby the signal voltage is modulated above and below the voltage of the energy source, the voltage of the energy source being adapted to energize the signal at source voltage after modulation of voltage below that of the source and before modulation above that of the source, said transferring means comprising a switch in the primary circuit connection, an electromagnet means for energizing said switch from said source and intermittently operating said switch to close, said switch also making and breaking its own energizing circuit.

PHILIP H. CHASE.